INCREMENT-DECREMENT REGISTER FOR MODIFYING A BINARY NUMBER

Filed Sept. 28, 1966 6 Sheets-Sheet 1

INVENTORS
FRANK J. CAMPANO
WILLIAM J. SPENCER

BY Douglas R. McKechnie
ATTORNEY

INCREMENT-DECREMENT REGISTER FOR MODIFYING A BINARY NUMBER

Filed Sept. 28, 1966 6 Sheets-Sheet 2

United States Patent Office 3,505,511
Patented Apr. 7, 1970

3,505,511

INCREMENT-DECREMENT REGISTER FOR MODIFYING A BINARY NUMBER

Frank J. Campano, Wappingers Falls, and William J. Spencer, La Grangeville, N.Y., assignors to International Business Machines Corporation, Armonk, N.Y., a corporation of New York Filed Sept. 28, 1966, Ser. No. 582,693
Int. Cl. G06f 7/385
U.S. Cl. 235—175 11 Claims

ABSTRACT OF THE DISCLOSURE

A digital data processing system has an increment-decrement register for modifying binary numbers by incrementing or decrementing the numbers by predetermined amounts. The register has a series of binary triggers arranged in groups for the purpose of carry handling whereby under carry conditions, a group or lookahead carry changes the state of the trigger of the lowest order of each group and the carry ripples through the remaining higher order triggers of the group to account for either an additive type of carry or a subtractive carry or borrow. Increment and decrement look ahead controls develop the group carry. Each binary trigger includes a flip-flop having set and reset input lines connected to a series of AND gates. Each gate includes at least one resistive input and a capacitive input connected through a diode to the associated input line of the flip-flop. By applying a negative voltage level to each resistive input and a negative going transition signal to the capacitive input, a negative spike triggering pulse is produced which might switch the flip-flop from one state to the other depending upon which state the flip-flop is in at the time the pulse is received. Each flip-flop also includes a DC reset input connected in common to like inputs of all other flip-flops whereby the register may be reset.

SUMMARY OF THE INVENTION

This invention relates to arithmetic devices for use in data processing systems. More particularly, it relates to an increment-decrement register, or incrementer-decrementer, that is useful for such purposes as, for example, modifying a binary number by increasing or decreasing the number by predetermined amounts.

Incrementers and decrementers are arithmetic devices that find many uses in a data processing system, particularly for modifying addresses of storage locations, of quantities of data handled by input output devices, etc. There are many different devices and ways by which a number can be modified, and while such ways may be suitable for the particular system for which they were designed, they are either too general or too specialized for other applications. For example, an adder-subtracter could be used by placing a first number therein and then increasing it by the fixed amount. However, such units have many inputs, one for each order of the number, and are thus much more complex than is needed tor a simple operation such as incrementing or decrementing a given number by one or by another fixed amount. Binary counters, on the other hand, are relatively specialized in that while a number may be read into it and increased or decreased by one any consecutive number of times, such counters are relatively slow for increasing the count by numbers greater than one. For example, to increase a number by eight requires that eight successive pulses be applied to the counter. Furthermore, counters are disadvantageous in that they have only one input, usually to the low order, and thus require that larger numbers or increments or decrements be obtained by use of many successive input pulses. They additionally are slow in carry propagation in that one stage of the counter is used to actuate the next stage so that, where a number involves a long series of carries of ones or zeros, a relatively long time is required for the successive stages to actuate each other. Incrementers and decrementers are also known in the prior art. Some have multiple registers and involve complementing and recomplementing the particular number to modify it. Such devices thus require extra hardware and are relatively slow due to the plural data transfers between registers. Other incrementers or decrementers are overly specialized in that while they are suitable, for example for incrementing, they cannot be used for decrementing.

Accordingly, one of the objects of the invention is to provide a high speed, versatile increment-decrement device that can be used as an incrementer or as a decrementer, or as both.

Another object is to provide an incrementer-decrementer which operates at high speeds due to relatively few data transfers and which has less hardware than prior art systems of the type in which the incrementing and decrementing is done by complementing and recomplementing.

Still another object is to provide an incrementer-decrementer in which the desired operation can be performed any number of consecutive times upon the data without having to set and reset any register, and without having to complement or recomplement the binary number.

A still further object of the invention is to provide an incrementer-decrementer having a plurality of binary triggers each of which is caused to switch between a one state and a zero state by triggering pulse produced by an input gate in response to the coincident application to the gate of voltage level conditioning signal and a transition signal such as a negative going leading edge of a square wave pulse.

Another object is to provide a high speed incrementer-decrementer having both ripple carry and carry look-ahead for both incrementing and decrementing.

In the preferred embodiment of the invention, an increment-decrement register is provided having a plurality of binary triggers corresponding to the number of bits in the number to be modified. Each trigger has a flip-flop provided with set and reset input lines and with one-side and zero-side output lines. Each flip-flop is switchable between a one-state and a zero-state by applying a triggering pulse to the proper input line for causing the switching to occur. Each trigger also has a plurality of selectively operated input gates connected to the input lines of the flip-flops. Each gate produces a triggering pulse in response to the coincident application thereto of a predetermined voltage level conditioning signal and a transition pulse. Each trigger further includes feedback lines connecting the output lines of the associated flip-flop to certain of the input gates for conditioning these gates to supply a triggering pulse to the appropriate flip-flop input line to cause the flip-flop to switch states. After data is read into the register, a first control line applies the conditioning signal for causing, for example, incrementing to occur, and a second control line supplies the transition signal to the trigger corresponding to the order of the amount of the increment or decrement so as to cause that particular binary trigger to switch states. The conditioning control signal is also used to condition higher order triggers so that under appropriate carry conditions a carry is generated in the lower order trigger and it is propagated to and through certain higher order trigger by ripple carry and a lookahead carry is generated in certain other higher order triggers and it is propagated through other higher order triggers by ripple carry.

The foregoing and other objects, features and advantages of the invention will be apparent from the following more particular description of a preferred embodiment of the invention, as illustrated in the accompanying drawings.

Figure 1:
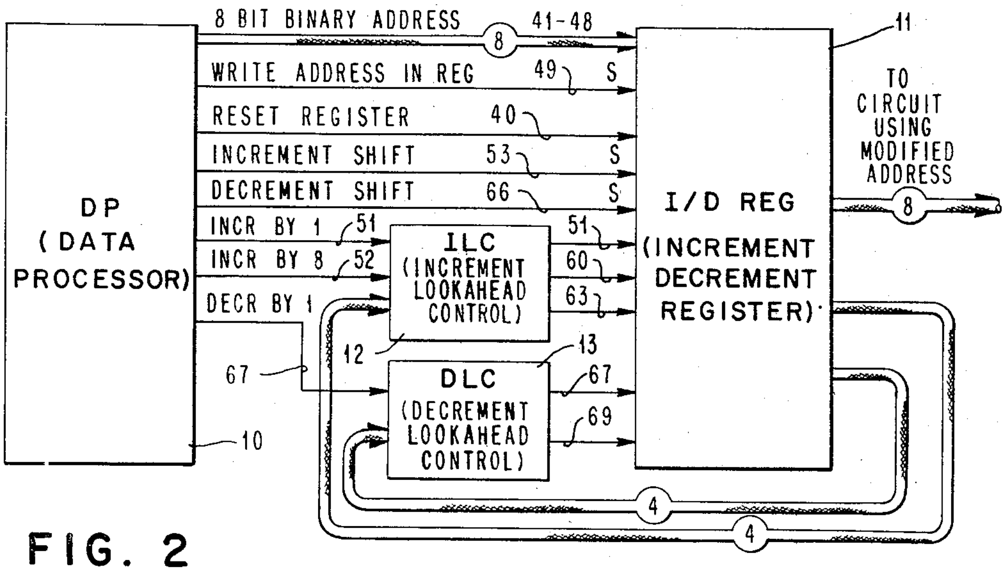
FIG. 1 is a block diagram of a portion of a data processing system embodying the invention.
Figure 3A:
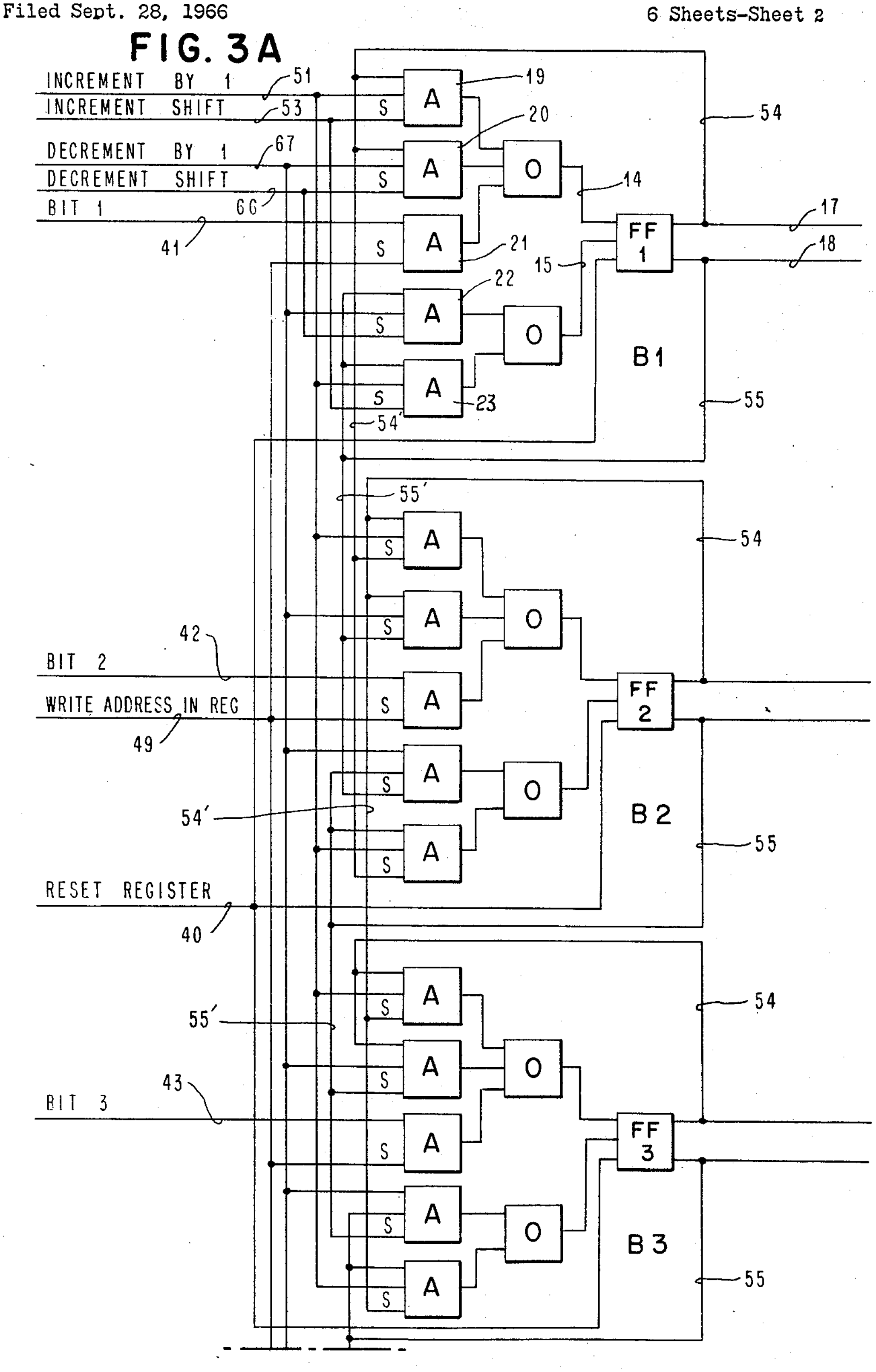
Figure 3B:
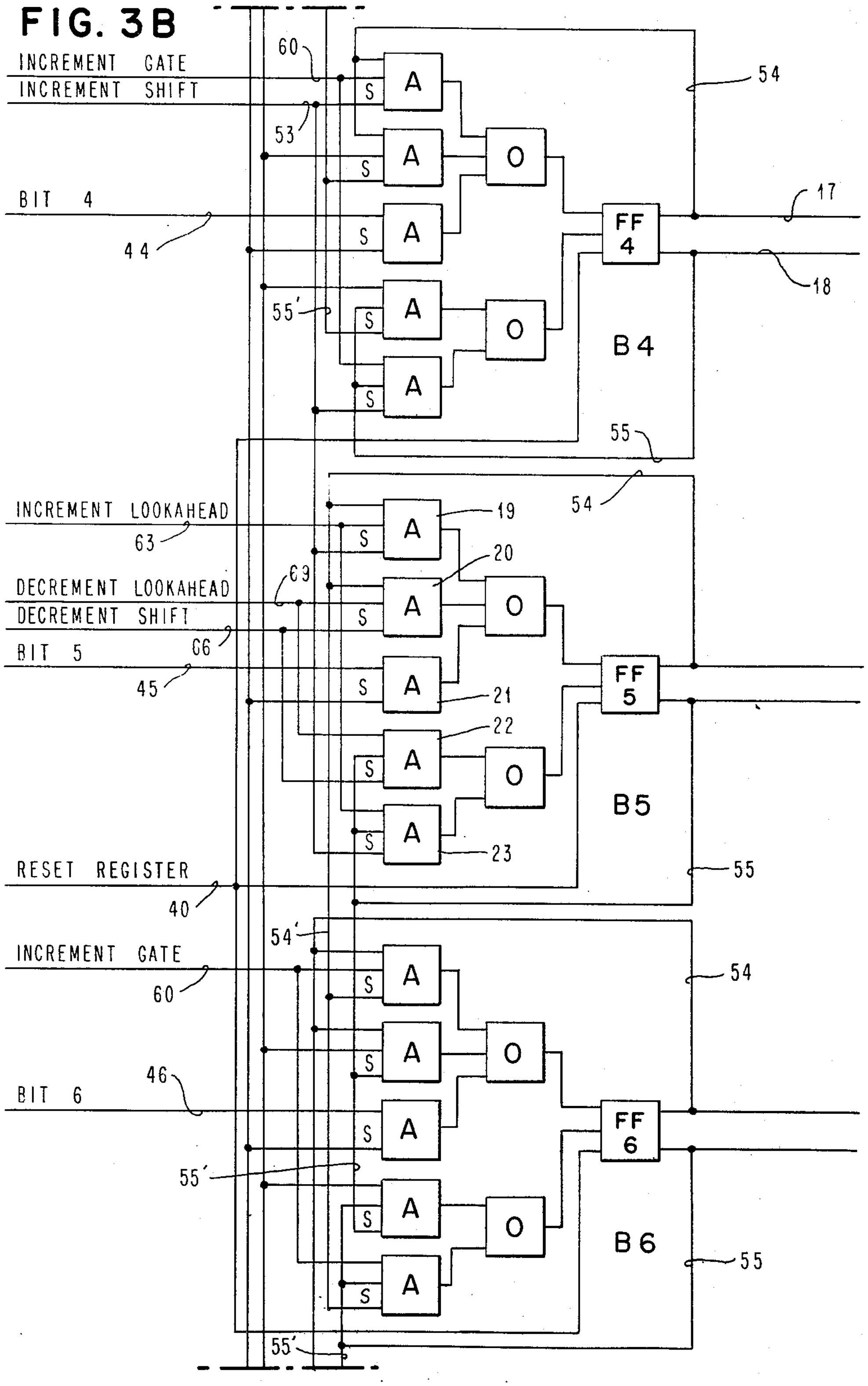
Figure 3C:
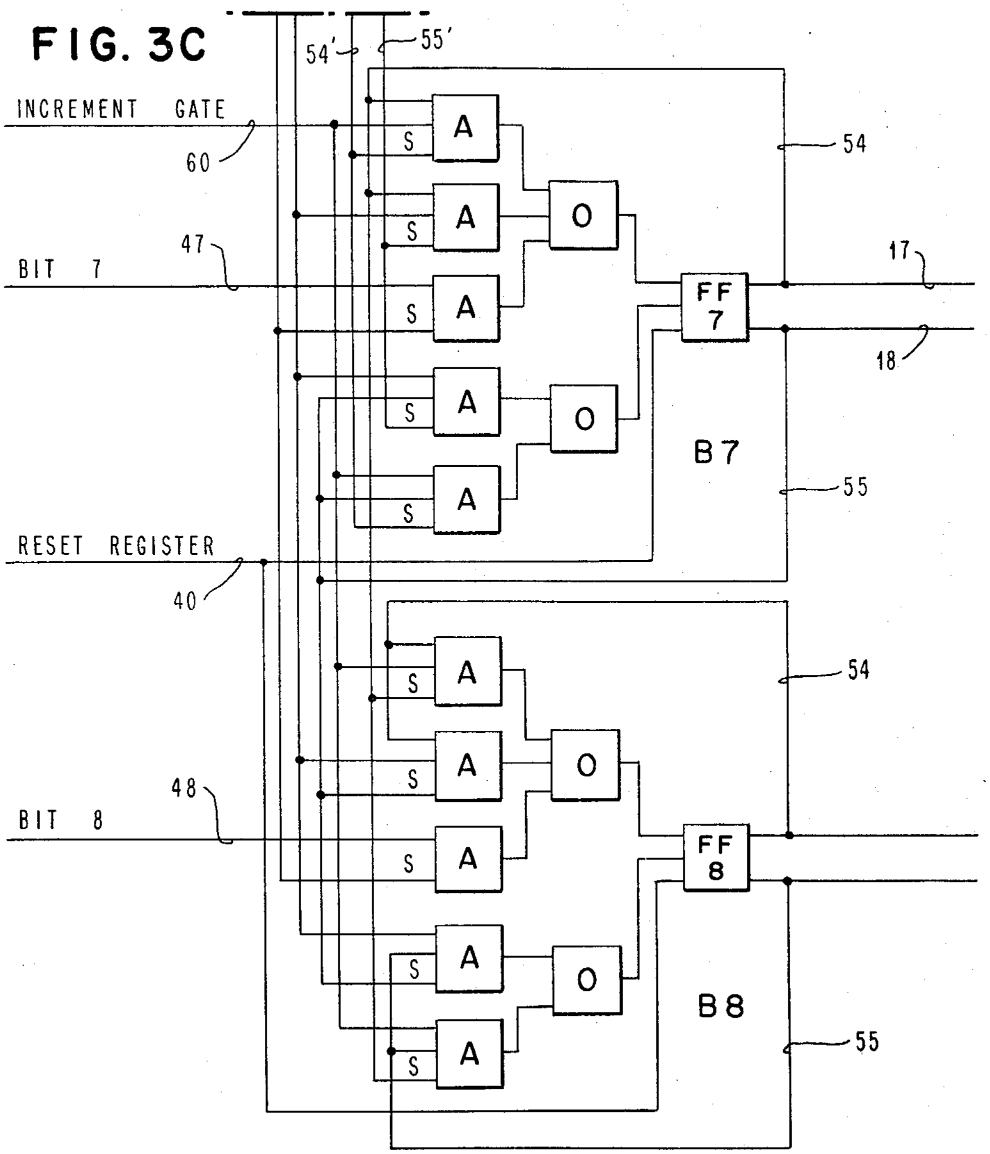
Figure 3D:
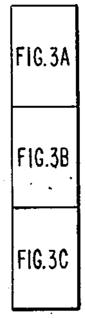
Figure 4:
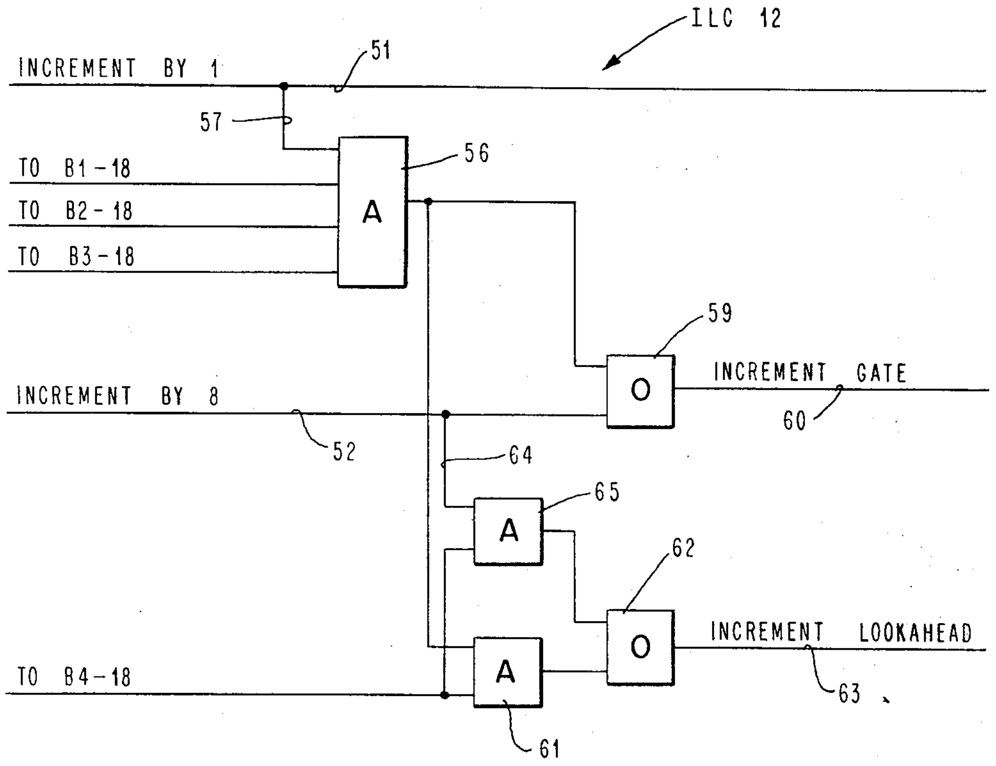
Figure 5:
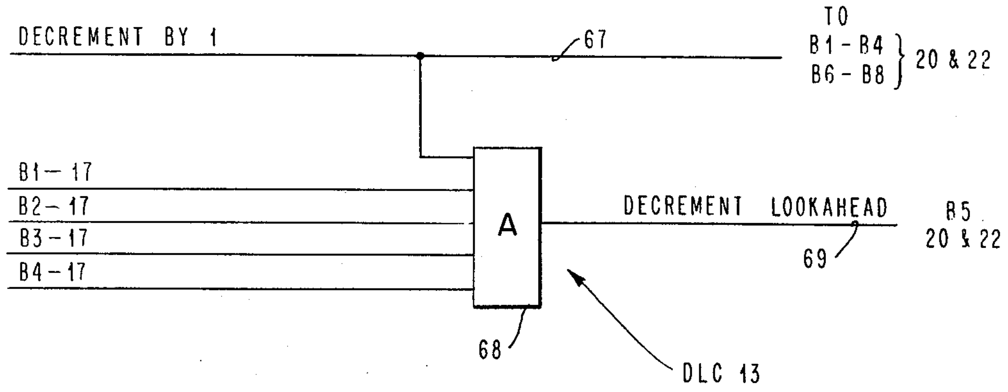
Figure 6:
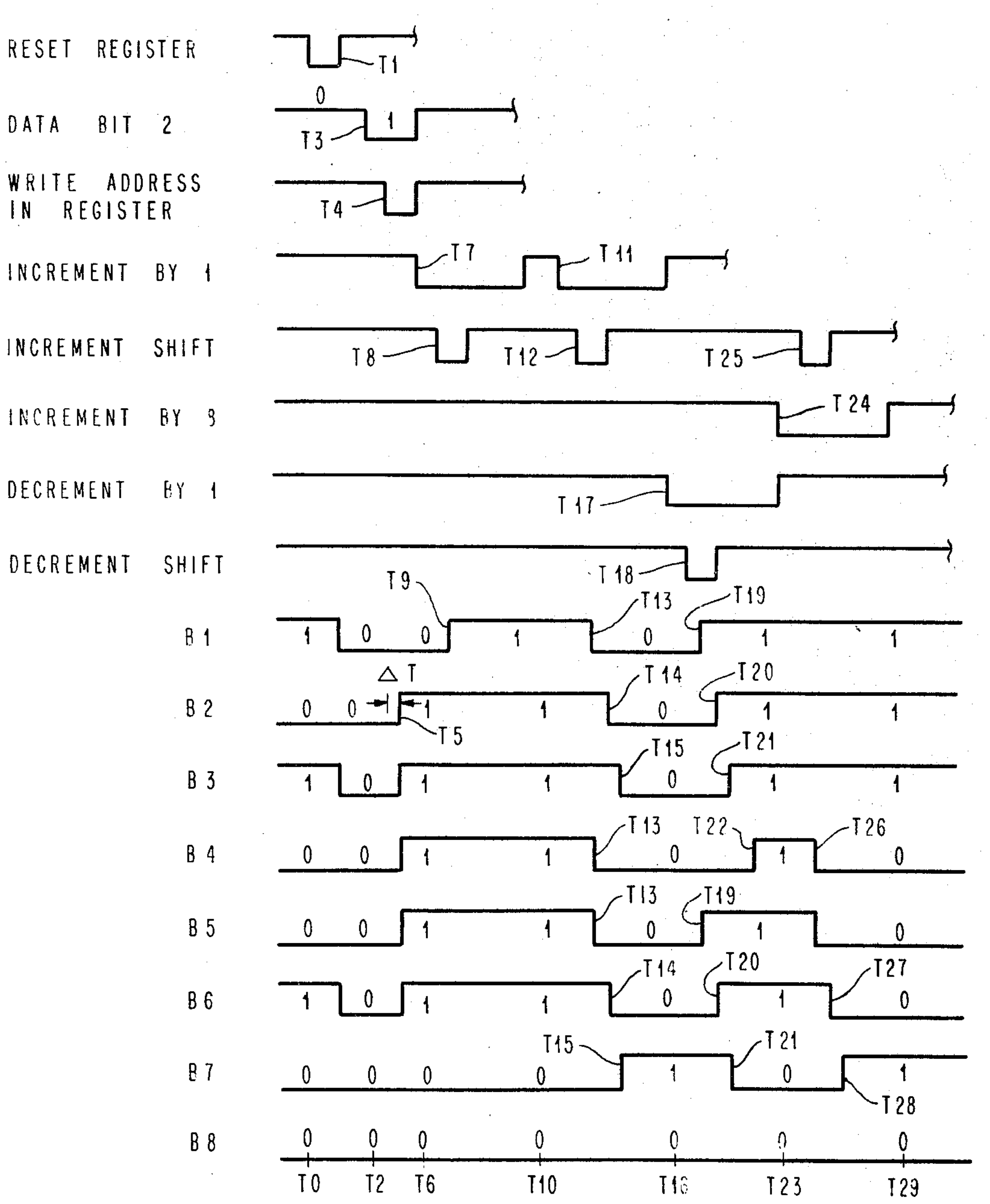

FIG. 3, formed by placing FIGS. 3A–3C next to each other as shown in FIG. 3D, is a logic diagram of the increment-decrement register;

FIG. 4 is a logic diagram of the increment lookahead control shown in FIG. 1;

FIG. 5 is a logic diagram of the decrement lookahead control shown in FIG. 1; and FIG. 6 is a timing diagram facilitating an understanding of the described example of operation of the invention.

Referring now to the drawings, the invention, while susceptible to a variety of uses, is shown and described illustratively with reference to its use in a data processing system for modifying an address, represented as an eight bit binary number, by selectively incrementing or decrementing the address by predetermined fixed amounts. A suitable DP (data processor) 10 provides the signals that are representative of the address to be modified and that control operation of the invention as more fully described below. Such signals are fed to an I/D Reg (Increment/Decrement Register) 11, and ILC (Increment Lookahead Control) 12, and a DLC (Decrement Lookahead Control) 13. I/D Reg 11 is an eight bit register having eight binary triggers B1–B8 that provide complemented output signals representative of the bits stored. Triggers B1–B8 are arranged in an ascending series of orders wherein trigger B1 provides the signals representing the lowest order bit, trigger B2 provides the signals representing the next higher order bit, and so on. The output of I/D Reg 11 is connected to the circuit of the data processing system that uses the signals representing the modified address.

Figure 2:
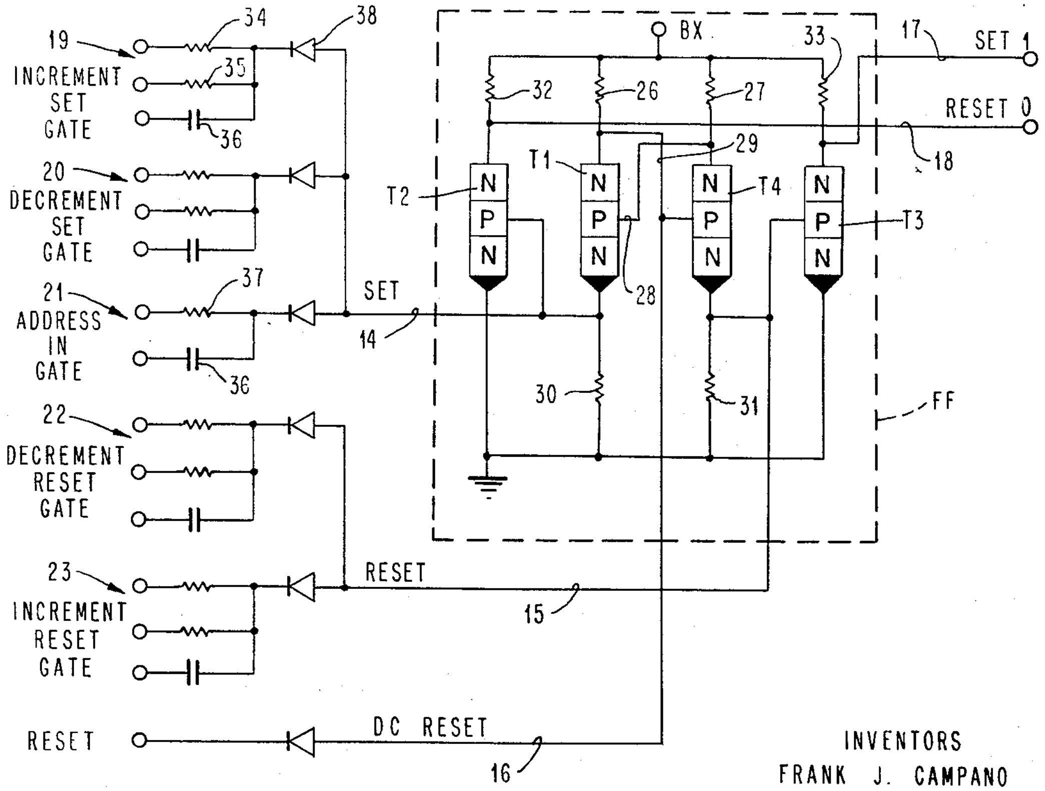
FIG. 2 is a wiring diagram of one of the bit positions of the increment-decrement register shown in FIG. 1.

Each trigger of I/D Reg 11 is similar so that only one need be described in detail. With reference to FIG. 2, each trigger B comprises a flip-flop FF having a Set input line 14, a Reset input line 15, a DC Reset line 16, and complemented output lines 17 and 18 which provide voltage level signals representing the bit stored in the flip-flop. Line 17 is the set output line or the one side output line and line 18 is the reset output line or zero side output of flip-flop FF. Flip-flop FF has two NPN transistors T1 and T4 connected so as to switch within narrow limits between stable states wherein one transistor conducts more than the other without either transistor saturating or cutting off. Flip-flop FF also has two other NPN transistors T2 and T3 whose bases are connected to the emitters of T1 and T4. During switching, the small transition produced in T1 or T4 is amplified and held by T2 or T3, one of which always cuts off while the other conducts. The collectors of T2 and T3 are connected to output lines 17 and 18. The output lines are complemented in that while one has a positive voltage level, the other has a negative voltage level. Flip-flop FF is in the zero state when line 17 has a negative signal and line 18 has a positive signal, and in the one state when line 17 has a positive signal and line 18 a negative signal. Flip-flop FF represents one and zero bits when in the one and zero states respectively.

When flip-flop FF is reset and is therefore in the zero state, transistor T4 is "On" and is conducting more heavily than transistor T1. Under such conditions, the voltage drop across resistor 27 is greater than that across resistor 26, and consequently the collector of T4 is more negative than the collector of T1. Thus, because of the cross connections by lines 28 and 29 between the collectors and bases of T1 and T4, T4 is forward biased more than T1 and the condition or state of flip-flop FF is stable. The current through T4 passes through a resistor 31 so as to forward bias transistor T3 causing it to conduct whereby the voltage drop across resistor 33 causes line 17 to be more negative than the voltage B+. However, the voltage at the base of T2 is equal to the voltage at the collector of T4 less the voltage drop from the base to emitter of T1 and is of such magnitude that T2 is cut off. Consequently, line 18, through resistor 32, is at the potential of B+ and is more positive than line 17. When flip-flop FF is set, that is in the one state, the above conditions are reversed and T1 and T2 are "On," T4 conducts less than T1 and is "Off," T3 is cut off, line 17 is positive and line 18 is negative. Flip-flop FF is switched from one state to the other by providing negative spike triggering pulses on lines 14 or 15, the pulses being produced by gates 19–23.

Gates 19, 20, 22 and 23 are similar. Each one has two resistors 34 and 35 connected in parallel with a capacitor 36 to form an RC network that is connected through a diode 38 and the associated set or reset input line to the emitter of T1 or T4. Gate 21 has only one resistor, 37, connected in parallel with a capacitor 36 to form a short-time constant RC network that is connected through a diode 38 and set line 14 to the emitter of T1. A triggering pulse is produced by applying a negative voltage conditioning signal to each resistor of a gate and a negative going leading edge of a square wave signal to the associated capacitor. These signals are differentiated by the RC network whereby the leading edge is passed by diode 38 and appears as the negative spike constituting the triggering pulse. The negative going leading edge is hereafter referred to as a transition signal. Neither the transition signal nor the required conditioning signals are effective, by themselves, to produce a triggering pulse that would initiate triggering of the flip-flop.

The triggering pulse initiates transition of flip-flop FF from one stable state to the other by causing the transistor to which the trigger pulse is applied to conduct more heavily than the other in the event it is not already doing so. For example, assume that flip-flop FF is reset and that it is desired to set flip-flop FF by applying appropriate signals to gate 19. By applying the conditioning signals to resistors 34 and 35 of gate 19, and then applying the transition signals to capacitor 36, a negative spike triggering pulse is applied via set line 14 to the emitter of T1. The spike momentarily forward biases T1 to a sufficient degree to momentarily upset the stability of the flip-flop and cause the flip-flop to start to switch from the reset state to the set state. The initial increase in current flow due to the spike through transistor T1 and resistor 26 reduces the forward bias on T4. This action reduces the current flow through resistor 27 and thereby increases the forward bias of transistor T1 until the current flowing through transistors T1 and T4 reach the set stable state of flip-flop FF. Thus, after the triggering pulse has terminated, transistor T1 conducts more than T4 and flip-flop FF is set or in the one state. By applying a triggering pulse on Reset line 15, flip-flop FF is switched from the one state to the zero state in a manner similar to that described above.

DC Reset line 16 is used to reset flip-flop FF by the application thereto of a DC negative reset signal. Line 16 is connected to the base of T4 so that if transistor T4 is "On" and flip-flop FF is set, a negative signal applied to line 16 biases the base of T4 in a reverse direction and cuts off T4 so that T1 conducts more heavily. When the reset signal is removed the flip-flop FF assumes the stable reset state in which T1 conducts more than T4.

It should be noted that the foregoing description describes an illustrative flip-flop that is used in the preferred embodiment of the invention, and that since the invention resides not in the details of the flip-flop but in the overall combination, other forms may be used. The features of any flip-flop that are necessary for the invention are that it have both set and reset input lines each of which requires at least one conditioning signal and one transition signal to initiate triggering action, and that it have output lines that complement each other.

FIG. 3 shows I/D Reg 11 in its equivalent logic form. The S represents the gate input lines to which the transition signals are applied (hereafter such lines are called set lines) and those input lines without the S's are the conditioning lines. For the particular trigger shown in FIG. 2, the active signals are negative voltage levels and negative going transition signals, but it is to be understood that positive and positive going transition signals can also be used with other forms of triggers. Hereafter, the various signals will be referred to by the legends shown in the drawings, and it will be understood that such signals are active only when they are negative or a negative going pulse. Gates 19–23 of each position act respectively as an increment set gate, a decrement set gate, an address in gate, a decrement reset gate and an increment reset gate.

DC Reset lines 16 of triggers B1–B8 are connected to line 40 so that a Reset Register signal supplied on line 40 by DP 10 causes all of triggers B1–B8 to switch to the zero states in the event they are not already therein. The address to be modified is read into I/D Reg 11 by supplying appropriate conditioning signals on lines 41–48 to all of gates 21 and by applying the Write Address In Register signal on line 49. Line 49 is connected to the set lines of gates 21 and causes those triggers to which active signals representing ones are applied to the conditioning lines, to switch from the zero state to the one state. That is, the set inputs of gates 21 of B1–B8 are connected by line 49 to DP 10, whereby an active transition signal is simultaneously applied to all of gates 21, so as to switch those flip-flops whose bit lines have been conditioned by signals representing one bits, to the one state.

In each trigger, a line 54 connects output line 17 to gates 19 and 20, and a line 55 connects output line 18 to gates 22 and 23 so that active signals on either gates 17 or 18 will partially condition gates 19 and 20, 22 and 23 to operate flip-flop FF in binary fashion in a manner more fully described below.

I/D Reg 11 is designed to increment a number read into it by increments of one or eight and to decrement the number by a decrement of one. However, it is to be understood that other fixed predetermined increments or decrements can be used and obtained. Further structure and operation of the invention might be best understood if explained with reference to these particular functions. In order to increment a number in I/D Reg 11 by one, DP 10 applies an Increment by 1 conditioning signal to line 51 and an Increment Shift transition signal to line 53. Lines 51 and 53 are each connected to gates 19 and 23 of trigger B1. As indicated above, one or the other of gates 19 and 23 is always partially conditioned due to an active signal on either of feedback lines 54 or 55, so that by applying the Increment by 1 signal and the Increment Shift pulse to these gates, flip-flop 1 is switched from one state to the other in response to the signals. The feedback lines, or binary wrapback, effectively steers the incoming signal so as to switch the binary trigger from one state to the other, each time such signals are received.

When FF1 switches from the one state to the zero state, during incrementing, a carry condition occurs wherein a carry from B1 may be rippled through B2 and B3, a lookahead carry may occur in B4, and a lookahead carry may occur in B5, which may then ripple through B6–B8 under appropriate carry circumstances. To accomplish the ripple carry from B1 to B2 and B3, line 54 of B1 is connected by line 54' to the set lines of gates 19 and 23 of B2, whereby the switching of FF1 to the zero state produces a negative-going, active transition signal for flipping or switching B2. That is, when FF1 switches to the zero state, the voltage level on line 17 changes from positive to negative to produce an active transition pulse. Similarly, line 54 of B2 is connected by line 54' to gates 19 and 23 of B3 whereby the switching of FF2 to the zero state produces an active signal for gates 19 and 23 of B3. Line 51 is connected by line 51' to gates 19 and 23 of B2 and B3 so that an Increment by 1 signal on line 51 conditions the appropriate ones of these gates, in conjunction with the feedback conditioning, to cause the carry signal from a lower order position to ripple to the next highest order.

The lookahead carry to B4 is accomplished by ILC 12. As shown in FIG. 4, output lines 18 of positions B1–B3 and line 51, by line 57, are connected to an AND circuit 56. Active signals are present on output lines 18 when each of flip-flops FF1–FF3 is in the one state and thus signify that a carry should be carried to higher orders. The output of AND 56 is connected to an OR circuit 59 to provide an Increment Gate signal on line 60 under those conditions in which an Increment by 1 signal is present and B1–B3 represent ones. Line 60 is connected to gates 19 and 23 of B4. Line 53, on which the Increment Shift appears, is also connected to these gates so that the Increment Gate and Increment Shift signals will cause B4 to switch from one state to the other.

In ILC 12, output line 18 of B4 and the output of AND circuit 56 are connected through an AND circuit 61 and OR circuit 62 so as to provide an Increment Lookahead signal on line 63 under those conditions wherein positions B1–B3 are all in the one state and the Increment by 1 signal is present. Line 63 is connected to gates 19 and 23 of B5 and these gates are also connected to line 53 upon which the Increment Shift signal appears. Thus, the combination of an Increment Lookahead signal and the Increment Shift signal causes FF5 to switch the one state to the other. By lines 54' positions B5–B7 are each connected to the next higher position so that the shifting of B5 from the one state to the zero state will produce an active set pulse that will switch FF6, and FF6 if it is in the one state will produce a shift pulse that switches B7, and so on, whereby the lookahead carry into position B5 may ripple through B6 and B7 to position B8.

In order to increment the number in I/D Reg 11 by eight, DP 10 applies an Increment by 8 signal to line 52 and an Increment Shift signal to line 53. Line 52 is connected through OR circuit 59 to provide the Increment Gate signal on line 60, which, in conjunction with the Increment Shift, is effective to switch trigger B4 from one state to the other. Trigger B4 is the binary equivalent of a decrement of eight. If B4 is in a one state, a lookahead carry is applied to B5. Line 52 by line 64 and the output 18 of B4 are connected to an AND circuit 65 whose output is connected through OR 62 to provide the Increment Lookahead signal on line 63 when position B4 is in the one state and the Increment by 8 signal appears. As previously indicated, the Increment Lookahead signal in conjunction with the Increment Shift is effective to switch B5 from the one state to the zero state and thereby generate a carry signal that may be rippled through B6, B7 and B8.

In order to decrement by one, DP 10 applies a Decrement Shift signal to line 66 and a Decrement by 1 signal to line 67. Lines 66 and 67 are connected to gates 20 and 22 of B1 so that the coincidence of the Decrement by 1 conditioning signal and Decrement Shift signal will cause FF1 to switch from one state to the other. When switching from the zero state to the one state, a subtractive carry or borrow condition exists wherein the borrow is rippled through triggers B2–B4, a lookahead borrow occurs in position B5 and a ripple borrow occurs in triggers B6–B8 as initiated by a change of FF5 from the zero state to the one state. It will be recalled that the switching from the zero state to the one state produces a negative going transition signal on line 55 and that such signal is active for operation of the various AND gates. To achieve the lookahead borrow, output lines 17 of B1–B4 and line 67 are connected through an AND circuit 68 to provide a Decrement Lookahead signal on line 69 when the low order positions B1–B4 are all in the zero state, and when a Decrement by 1 signal appears. Line 69 is connected to gates 20 and 22 of trigger B5, and in conjunction with the Decrement Shift line 66, causes B5 to switch states. In each case, the control or command signals, that is the Increment by 1, Increment by 8, or Decrement by 1 signals, are maintained for a sufficient period of time to allow the carries or borrows to ripple through the successive positions.

The invention will now be further explained with reference to a specific example as described with particular reference to FIG. 6. FIG. 6 is a timing diagram designed to illustrate certain principles of operation of the invention and it does not purport to be an accurate representation of the form of the various signals that appear on the lines, since, as is well-known, square waves have sloping leading and trailing edges, noise, etc. The example of operation will be to first reset I/D Reg 11, write in the binary address or number 00111110, and then modify the number by the steps of incrementing by one, incrementing by one a second time, decrementing by one, and finally incrementing by eight. In FIG. 6, the signals representing the states of B1–B8 are taken from output lines 17 thereof.

At time T0, I/D Reg 11 contains the binary number 00100101. At at later time, the Reset Register signal is applied on line 40 and lines 16 and when this signal is removed, at T1, each of the triggers will then be in the zero state so that at T2, I/D Reg 11 is reset to all zeros. At T3, active signals appear on those lines 41–48 which are representative of ones and at T4, the Write Address in Register signal is applied to line 49 causing the eight bit binary address that is to be modified to be read into I/D Reg 11. The difference between times T3 and T4 is that period in which the RC network of each gate has had time to reach the condition state so that the negative going set pulse will produce the negative spike necessary for switching the flip-flop. In each bit position, a time delay caused by the circuit parameters exists as represented as the difference between T5 and T4, or ΔT, so that while the set pulse occurs at T4, the various flip-flops will not switch states until T5. Thus, at T6 the binary number 00111110 exists in I/D Reg 11. At T7, Increment by 1 signal is applied to line 51, and at T8 the Increment Shift pulse causes flip-flop FF1 to switch from the zero state to the one state. This occurs at T9. Thus, at T10, binary number 00111111 is in I/D Reg 11. At T11 and T12, the Increment by 1 signal and Increment Shift pulse causes FF1 to switch from the one state to the zero state, and the switching of FF1 generates a carry signal that switches FF2 to the zero state and this in turn generates a carry signal that switches FF3 to the zero state, the switching of FF1–FF3 occurring at T13, T14, and T15. By means of the lookahead circuit, FF4 and FF5 are switched at T13, and by means of the carry signal generated by the switching of FF5, FF6 is switched at time T14, and this in turn causes FF7 to switch from the zero state to the one state at T15. Since FF7 did not switch from the one state to the zero state, no further carry is generated. Therefore, at T16 I/D Reg 11 contains the number 01000000.

At T17 and T18, respectively, the Decrement by 1 signal and Decrement Shift pulse are applied to lines 66 and 67, and this causes FF1 to switch from the zero state to the one state at T19. This switching produces the borrow signal that ripples through FF2 and FF3 causing them to switch from the zero state to the one state at time T20 and T21. The decrement borrow is also rippled to FF4 causing it to switch from the zero to one state at time T22. By means of the lookahead circuitry, FF5 is switched from a zero state to the one state at time T19, and thereafter FF6 is switched from the zero state to the one state at T20, and FF7 is switched from the one state to the zero state at time T21. The time difference between T18 and T22 represents the maximum period of time required for any ripple carrying or borrowing to take place, and it is throughout this maximum period that the conditioning signals produced by the control signals must be maintained.

Thus, at T23, I/D Reg 11 represents binary number 00111111. At T24 and at T25, the Increment by 8 and Increment Shift signals are applied on lines 52 and 53. Increment by 8 signal 52 produces the Increment Gate signal and Increment Lookahead signal on lines 60 and 63, and such signals are effective to cause FF4 and FF5 to switch from the one state to the zero state at T26, FF6 to switch from the one state to the zero state at T27, and FF7 to switch from the zero state to the one state at T28. Consequently, at T29, I/D Reg 11 has the number 01000111.

It will thus be seen that the carry switching principles involved in the operation of I/D Reg 11 are as follows. During incrementing, when an additive carry condition exists in a low order trigger, all consecutive higher order triggers in the one state, and the first higher order trigger in the zero state encountered are all switched to opposite states and the remaining triggers are not switched. During decrementing when a subtractive carry or borrow condition exists, those consecutive higher order triggers in the zero state and the first higher order trigger in the one state are switched, and the remaining triggers are not switched. The term "carry" as used herein is generic to an "additive carry" which occurs during incrementing, or from a zero state to a one state during decrement, such signal being applied to the adjacent higher order trigger to cause a ripple carry. The other type of carry signal is provided by applying the Increment Shift and Decrement Shift signals to certain higher order triggers to cause a lookahead carry process to be carried out. Such lookahead process causes the higher order triggers to switch, under carry conditions, simultaneously with the switching of the lowest order trigger being switched, and to a "subtractive carry" or "borrow" which occurs during decrementing. A "carry condition" is a condition of the triggers wherein one or more higher order triggers need to be switched so that the bits of the number represented thereby are handled, during incrementing and decrementing, in accordance with the usual method of handling a carry as determined by the well-known laws of arithmetic for binary addition and subtraction.

It should also be noted that the Increment by 1, Increment by 8, and Decrement by 1 conditioning signals are command or control signals which perform two purposes. The first purpose of each such signal is to condition trigger B1 or B4 so that the subsequent receipt of the Increment Shift or Decrement Shift signal causes the command to be executed by switching B1 or B4 as the case may be. These latter signals are deemed execution type of control signals. The second purpose is to condition higher order triggers during carry conditions so that they will switch states upon the receipt of carry signals. One form of carry signals is the transition signal generated by a trigger switch from one state to a zero state during incrementing.

The foregoing describes only one example of operation of the disclosed embodiment, and such example was selected to illustrate the various carry switching principles and timing principles involved with the invention. While in the example a single number or address was modified several times, it may be, in actual practice, more common for each number to be modified only once or twice.

It should also be appreciated that for the purpose of illustrating the invention, I/D Reg 11 contained eight bits and that while the principle of the lookahead carry or borrow was effective to speed up the operation by limiting the time required for carry switching to occur, that such principle is more applicable to registers having a greater number of bit positions. It should be also understood that an incrementer could be formed merely by eliminating the decrement circuitry, and that a decrementer could be formed by eliminating the incrementer circuitry. Also that while the arbitrary increment of eight was illustrated, other fixed values of increments could be used and also the principle could be applied to decrementing by a fixed decrement greater than one.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An arithmetic system comprising:

a register having a series of bistable devices arranged to represent consecutive orders of a binary number;

each of said devices being switchable between a zero state and a one state and having:

two output lines providing complemented signals representative of the state of said device and of the bit of the order represented by said device, a set input line adapted to receive a triggering pulse for switching said device from a zero state to a one state, and a reset input line adapted to receive a triggering pulse for switching said device from a one state to a zero state;

a plurality of pairs of gates, each pair connected to a different one of said devices for supplying triggering pulses to said input lines thereof, each of said gates having first and second inputs adapted to receive conditioning signals, and a third input adapted to receive a transition signal whereby each gate will apply a triggering pulse to the device input line connected thereto in response to receiving said conditioning and transition signals;

first means connecting said output lines of said devices to said first inputs of said gates for supplying conditioning signals thereto in accordance with the states of said devices;

second means connected to said register for switching said devices to represent a number to be modified arithmetically;

third means for selectively supplying a command conditioning signal to said second inputs of the pair of gates connected to the one of said devices representing a low order bit of said number;

fourth means for supplying an execute transition signal to said third inputs of said pair of gates to which said third means supplies said command conditioning signal whereby said device representing said low order bit will switch states so as to modify said number;

and carry handling means connected to the inputs of the gates of said devices representing high order bits for switching such high order devices in accordance with existing carry conditions.

2. A system in accordance with claim 1 wherein said carry handling means comprises:

means connected to said third means for conditioning said second inputs of said gates of said high order devices for potential carry switching, and means connected to said third inputs of said high order devices for supplying transition carry signals thereto for switching said high order devices according to said carry conditions.

3. A system in accordance with claim 2 wherein at least some of said high order devices are arranged in a group adjacent to each other for ripple carry therethrough whereby the higher order devices of each group are switched in response to the signals on said output lines of the adjacent lower order device switching from one predetermined state to the other state thereof.

4. A system in accordance with claim 3 including lookahead carry means connected to the lowest order device of said group for switching it under carry conditions simultaneously with the switching of said device representing said low order bit by means of which said number is to be modified.

5. A system according to claim 3 wherein said command and execute signals are operative to increment said number, and said ripple carry occurs in response to said adjacent lower order device switching from said one state to said zero state.

6. A system according to claim 3 wherein said command and said execute signals are operative to decrement said number, and said ripple carry occurs in response to said adjacent lower order device switching from said zero state to said one state.

7. A system according to claim 1 and including:

fifth means for selectively supplying second command conditioning and execute transition signals to gates of a device representing a higher order bit whereby said number can be modified by switching device representing different orders thereof;

said carry handling means being operative to switch any devices of a higher order than said last-mentioned high order device, under carry conditions.

8. A system according to claim 1 wherein said command and said execute signals are operative to increment said number, and said system further includes:

a plurality of second pairs of gates each associated with a different one of said devices and arranged similarly to said first mentioned plurality of gates for decrementing operations;

and fifth means for selectively supplying decrement command and execute signals to one of said second pair to decrement said number according to the order of the device associated therewith;

said carry handling means being operative to switching higher order devices according to whether an incrementing operation or a decrementing operation is occurring so as to selectively account for both an additive carry condition and a borrow condition.

9. A system according to claim 8, comprising:

means for selectively supplying third command and execute signals to higher order device for switching said device so as to modify said number in a manner different from that caused by either of said other command and execute signals.

10. A system according to claim 8, wherein:

said devices are arranged in groups, and said carry handling means is operative to switch the lowest order device of each group under carry conditions in response to applying one set of said command and execute signals whereby carry signals ripple through higher order devices of each group.

11. A system according to claim 10 wherein:

said carry handling means comprises lookahead control means for switching said lowest order device of each higher group in accordance with each lower order device being in a state presenting a carry condition and with the receipt of signals causing said number to be modified.

References Cited

UNITED STATES PATENTS

| | | | |
|---|---|---|---|
| 3,394,249 | 7/1968 | Abernathy et al. | 235—168 X |
| 3,375,358 | 3/1968 | Franck | 235—175 |
| 3,145,293 | 8/1964 | Homan | 235—175 X |
| 2,703,202 | 3/1955 | Cartwright | 235—92 |

OTHER REFERENCES

W. N. Carroll: High-Speed Counter Requiring No Carry Propagation, IBM Journal, October 1960, pp. 423–425.

MALCOLM A. MORRISON, Primary Examiner

D. H. MALZAHN, Assistant Examiner

U.S. Cl. X.R.

235—168